L. COOPER.

Fertilizer.

No 9,339.

Patented Oct. 19, 1852.

UNITED STATES PATENT OFFICE.

LEWIS COOPER, OF COOPERSVILLE, PENNSYLVANIA.

IMPROVEMENT IN SPREADING LIME AND MANURE.

Specification forming part of Letters Patent No. 9,339, dated October 19, 1852.

*To all whom it may concern:*

Be it known that I, LEWIS COOPER, of Coopersville, in the county of Lancaster and State of Pennsylvania, have invented a certain new and useful improvement in the machine for distributing lime and various pulverized manures or chemical agents for fertilizing land, planting seed, &c.; and I do hereby declare that the following is a full, clear, and exact description of the same, reference being had to the accompanying drawings, forming part of this specification, in which—

Figure 1:
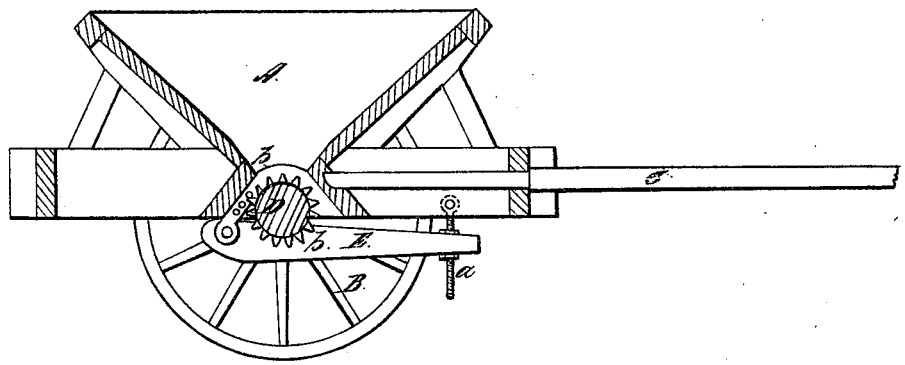
Figure 2:
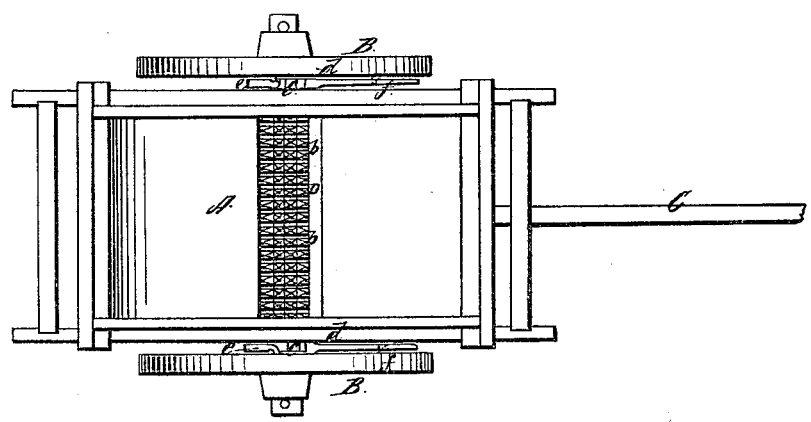
Figure 3:
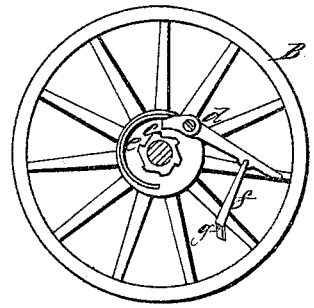

Figure 1 is a longitudinal section of the machine; Fig. 2, a top view thereof. Fig. 3 is a detached face view of one of the propelling-wheels, illustrating the devices for disconnecting the distributing-cylinder.

The same letters of reference denote corresponding parts.

A is a box or trough for holding the lime or other fertilizing ingredient, and mounted on wheels B. C is a draft-pole or tongue for hitching cattle thereto; D, the pulverizing and distributing cylinder. It is of length to stretch across the under surface of the trough, into which, as it were, it slightly projects. It is thrown in or out of gear with the propelling-wheels B as required, being attached thereto and hung as follows: The wheels B are fitted so as to turn on necks extending from the ends of the cylinder D, the said necks forming the axle, as it were, each neck resting on and turning in a bearing formed on or in a lever, E, (one on either side of the machine,) which, held up by an adjusting-screw, $a$, at its loose end, admits of the cylinder D being raised or lowered, so as to project more or less into the trough and vary the discharge of ingredients by the increased or diminished vacancy or space between the cylinder and bottom of the trough, the cylinder D being studded with pyramidal teeth $b$, which as the cylinder rotates pulverize by their points and sharp edges the lime or other chemical fertilizing agent or manure and deliver it in even courses on the ground; or the same cylinder may act as a seed-distributer for broadcast sowing.

For manuring or fertilizing the ground by chemical agents the machine as it is drawn over the field or ground accomplishes this, as described, by the cylinder D rotating together with the propelling-wheels B; but when it is desired to traverse the machine without distributing I disconnect the said cylinder from gear with the wheels B by the following devices: On either neck of the cylinder D is a ratchet-wheel, $c$, into which fits or locks the one end of a lever-pawl, $d$, attached to either propelling-wheel and pressed into bite with the teeth of the ratchet-wheel $c$ by means of a spring, $e$, secured at one end to each wheel B. The lever-pawl $d$ is double, having its fulcrum on the propelling-wheel near one end of its length, the short arm forming the pawl, while the longer arm has attached to it a cord or strap, $f$, which, by pulling and hitching onto a pin, $g$, projecting from one spoke of either propelling-wheel, throws the cylinder D out of gear, or prevents it from rotating as the machine travels forward, by reason of the short arm of the lever-pawl $d$ being disconnected from the teeth of the ratchet-wheel $c$, fast to either neck of the cylinder D; but by simply unhooking the strap $f$ from the pin $g$ the spring $e$, acting on the short arm of the lever-pawl $d$, puts the said lever-pawl, and consequently the propelling-wheel, in gear with the distributing-cylinder D, as specified.

What I claim as new and useful, and desire to secure by Letters Patent, is—

So constructing the pulvering and fertilizing apparatus as to effect the several functions of pulverizing and distributing manures of various kinds at will by so arranging the roller D that it can be raised or depressed in the discharging-opening of the bottom of the hopper to any required level, so as to discharge a larger or smaller quantity of material previously brought to the desired degree of fineness in the hopper, and at the same time to act as a valve to close more or less tightly the bottom of the hopper, the same roller likewise serving as a distributer of seed in sowing broadcast without any alteration of the machine, substantially as herein set forth.

In testimony whereof I have hereunto signed my name before two subscribing witnesses.

LEWIS COOPER.

Witnesses:
W. P. ELLIOT,
A. E. H. JOHNSON.